(12) United States Patent
Bálint (10) Patent No.: US 10,721,342 B2
(45) Date of Patent: Jul. 21, 2020

(54) BATTERY LOCK

(71) Applicant: NCR Corporation, Atlanta, GA (US)

(72) Inventor: Márton Bálint, Salzburg (AT)

(73) Assignee: NCR Corporation, Atlanta, GA (US)

(*) Notice: Subject to any disclaimer, the term of this patent is extended or adjusted under 35 U.S.C. 154(b) by 119 days.

(21) Appl. No.: 16/144,090

(22) Filed: Sep. 27, 2018

(65) Prior Publication Data
US 2020/0106868 A1 Apr. 2, 2020

(51) Int. Cl.
*H01M 2/00* (2006.01)
*H04M 1/02* (2006.01)
*H01M 2/10* (2006.01)

(52) U.S. Cl.
CPC ....... *H04M 1/0262* (2013.01); *H01M 2/1066* (2013.01); *H01M 2220/30* (2013.01)

(58) Field of Classification Search
CPC ............ H04M 1/0262; H01M 2/1066; H01M 2220/30
See application file for complete search history.

(56) References Cited

U.S. PATENT DOCUMENTS

2005/0130034 A1* 6/2005 Buck .................. B25F 5/02
429/160

* cited by examiner

*Primary Examiner* — Lisa S Park
(74) *Attorney, Agent, or Firm* — Schwegman, Lundberg & Woessner (57) ABSTRACT

Disclosed are battery locks. The batter locks may include a body, a first arm, and a second arm. The body may have a first end, a second end, and a pivot axis. The pivot axis may be located in between the first end and the second end. The first arm may extend from the body proximate the first end. The first arm may be configured to provide a biasing force that biases movement of the body in a first direction about the pivot axis. The second arm may extend from the body proximate the first end. The second arm may be configured to provide an ejection force to a battery.

20 Claims, 6 Drawing Sheets

BATTERY LOCK

SUMMARY

Disclosed are battery locks. The batter locks may include a body, a first arm, and a second arm. The body may have a first end, a second end, and a pivot axis. The pivot axis may be located in between the first end and the second end. The first arm may extend from the body proximate the first end. The first arm may be configured to provide a biasing force that biases movement of the body in a first direction about the pivot axis. The second arm may extend from the body proximate the first end. The second arm may be configured to provide an ejection force to a battery.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any invention disclosed herein is defined by the appended claims.

Portable computing devices generally require a battery for operation. The battery may be removable so as to allow continued operation with a new battery while a depleted battery is charged. As disclosed herein, a locking device may be used to secure the battery into the portable computing device.

The battery lock may include combine many functions into a single part. For example, the battery lock may include a body that acts as a lever. The body may allow for the locking and unlocking of the battery. The body may include one or more arms that may be preloaded so as to keep the body of the batty lock in a locked position. The one or more arms may also be preloaded and eject the battery as the lever is operated. For example, when a user pressed a button, the one or more arms may cause the battery to pop out of a housing of the portable computing device.

As disclosed herein, the battery lock may include with four arms. A first pair of arms may include pins at the ends that not only preload the body itself but may preload the battery in the direction of retention. A second pair of arms, without the pins, may only preload the body itself.

The pins, which may be vertical, of the first pair of arm may be arranged to contact, grip, or otherwise engage a corresponding form element of the battery. Additional pins, which may be horizontal pins, may be slides. A function of the additional pins may be to counterforce the torque because of the forces applied on the vertical pins by the battery.

Figure 1:
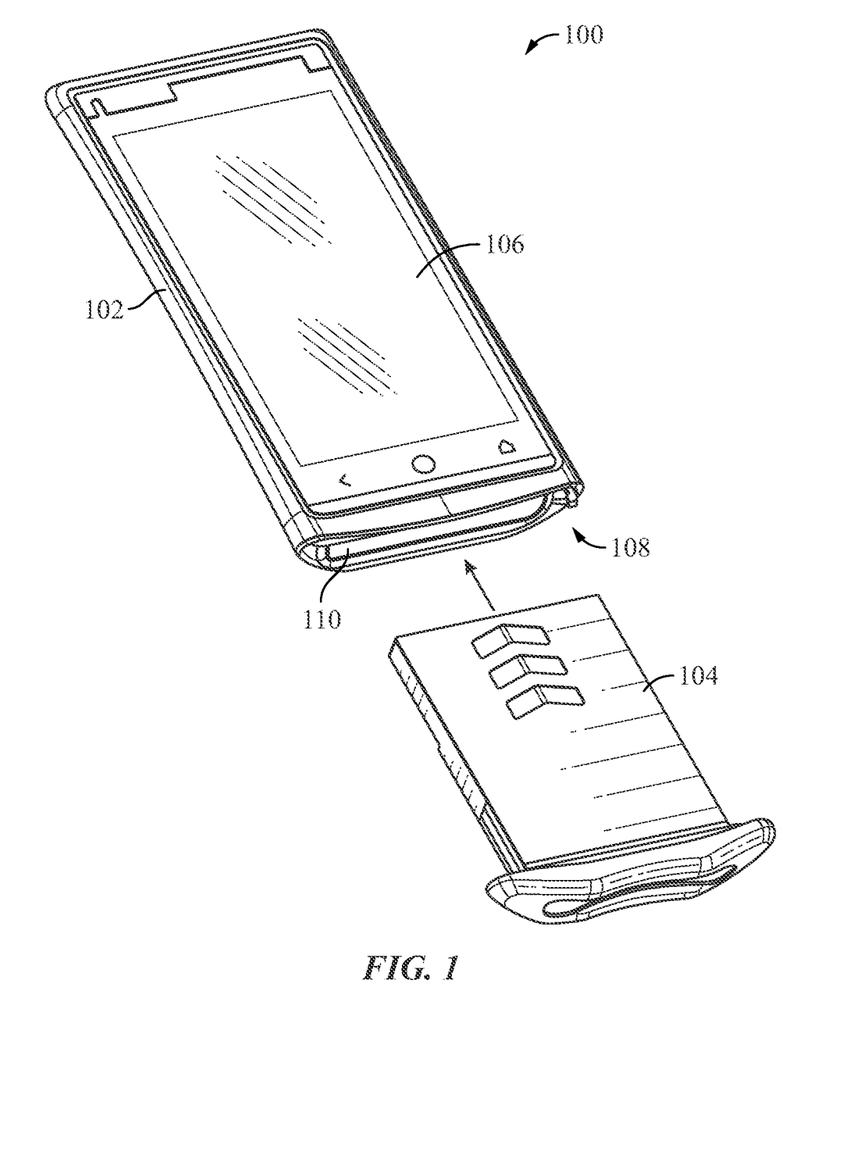
FIG. 1 shows an example portable computing device consistent with this disclosure.

Turning now to the figures, FIG. 1 shows a portable computing device 100 consistent with embodiments of this disclosure. Portable computing device 100 may include a housing 102 and a battery 104. The housing may include a display 106. In addition, the housing may define a cavity 108 and an opening 110 sized to allow at least a portion of battery 104 to slide into cavity 108.

Figure 2:
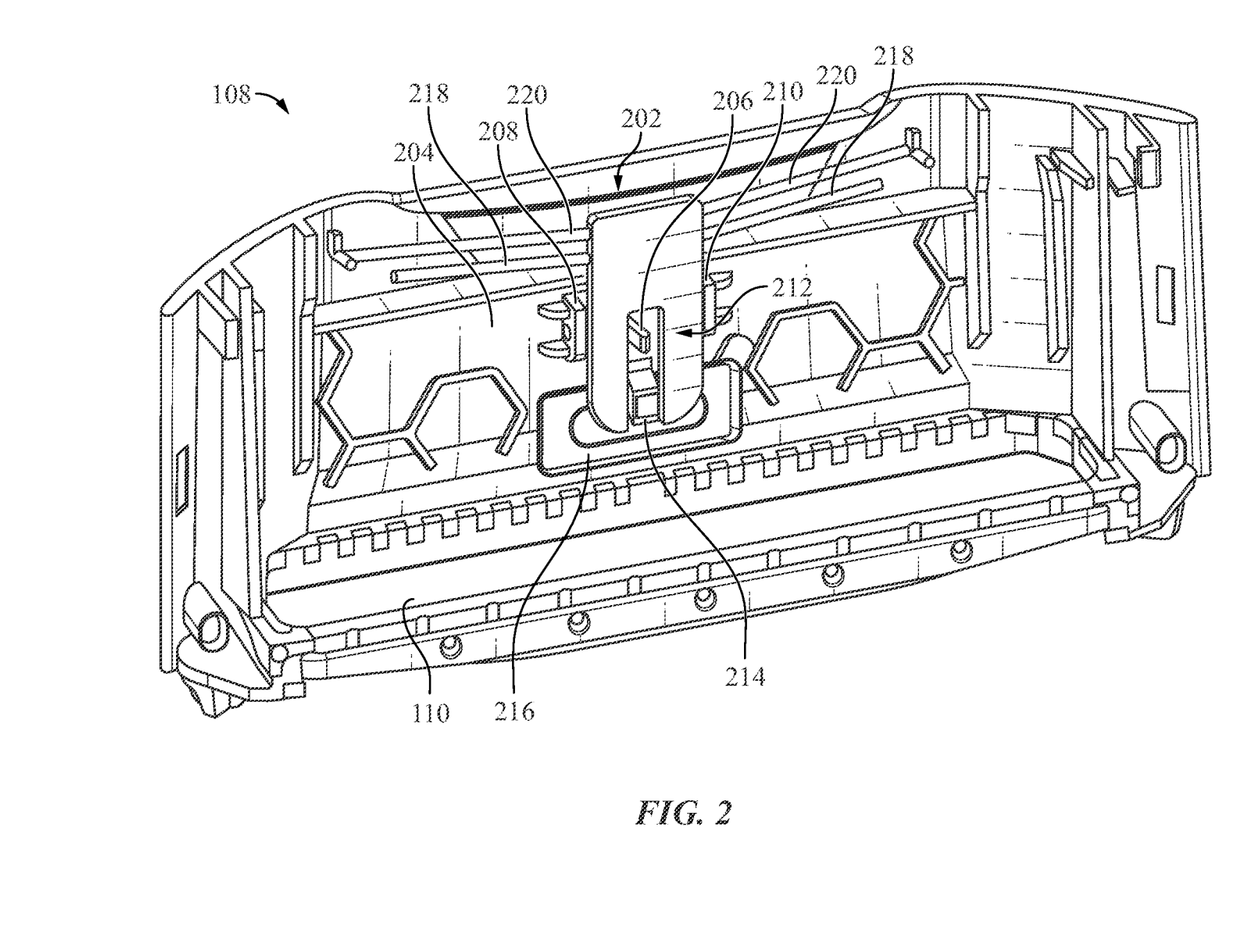
FIG. 2 shows an example a battery lock consistent with this disclosure.

As shown in FIG. 2, portable computing device 100 may include a battery lock 202. Battery lock 202 may be positioned proximate a first surface 204 of housing 102. As shown in FIG. 2, a pin 206 may be used to secure battery lock 202 to one or more protrusions 208 and 210. As disclosed herein, pin 206 may pass through battery lock 202 and provide a pivot point about which battery lock 202 may rotate.

Battery lock 202 may define a notch 212. Notch 212 may be sized to receive a protrusion 214. Protrusion 214 may be a component of a button 216. As disclosed herein when button 216 is pressed, button 216 may contact a second end of battery lock 202 and cause battery lock 202 to pivot about pin 206.

Battery lock 202 may also include a first plurality of arms 218 and a second plurality of arms 220. The first plurality of arms 218 may contact first surface 204 and may be preloaded to generate a biasing force. The biasing force may act to cause battery lock 202 to pivot about pin 206 in a direction opposite that caused when button 216 is pressed.

Figure 3:
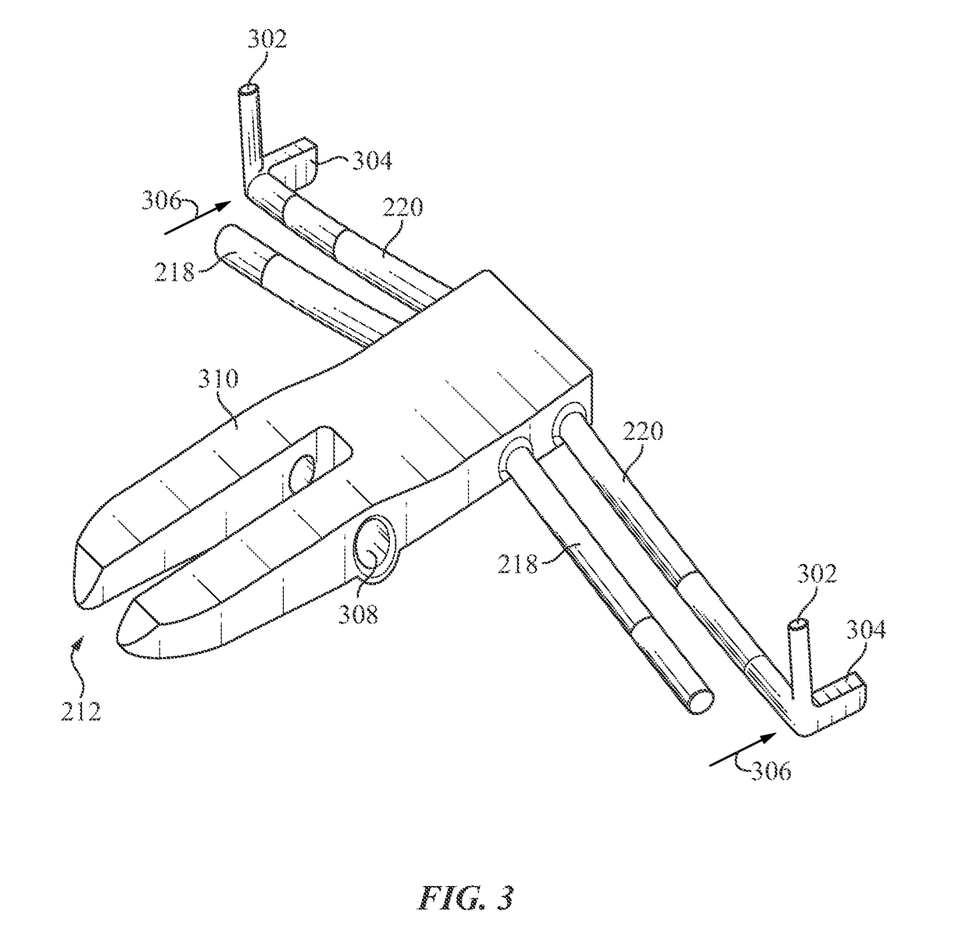
FIG. 3 shows an example a battery lock consistent with this disclosure.

As shown in FIG. 3, each of second plurality of arms 220 may include may include a first pin 302. As disclosed herein, first pins 302 may contact a surface of battery 104. During insertion of battery 104, the contact between first pins 302 and the surface of battery 104 may cause second plurality of arms 220 to flex as indicated by arrows 306. The flexing of second plurality of arms 220 may generate an ejection force such that upon pressing of button 216, batter 104 may be ejected from cavity 108.

Each of second plurality of arms 220 may also include a second pin 304. Second pins 304 may project from second plurality of arms 220 at an angle, such as 90 degrees, to first pins 302. As battery 104 is inserted into cavity 108 and contacts first pins 302, second pins 304 may slide against first surface 204. Second pins 304 may act to counter the torque placed on second plurality of arms 220 as battery 104 presses against first pins 302.

As shown in FIG. 3, a body 310 of battery lock 202 may define a through hole 308. Through hole 308 may be located in between a first end and a second end of body 310 of battery lock 202. First plurality of arms 218 and second plurality of arms 220 may extend from body 310 of battery lock 202 proximate the first end. Notch 212 may be defined proximate the second end of body 310 of battery lock 202.

The position of first plurality of arms 218 and second plurality of arms 220 may be such that desired forces are generated. For example, the location of second plurality of arms 220, along with the length of second plurality of arms 220, may be such that a specified ejection force, such as X Newtons, is generated and preloaded when battery 104 is installed. In addition, the location, as well as length, of first plurality of arms 218 may be such that when battery 104 is installed, first plurality of arms 218 cause the first end of body 310 to press against batter 104 as disclosed herein.

While FIGS. 2 and 3 show battery lock 202 having four arms that are evenly distributed on opposite sides of body 310, battery lock 202 may include any number of arms. For example, instead of first plurality of arms 218 having two arms as shown, first plurality of arms 218 may only include one arm or three or more arms. In addition, second plurality of arms 220 may only include one arm or three or more arms. For instance, instead of four total arms as shown in FIG. 3, battery lock 202 may have two arms and one of the arms may include first pin 302 and second pin 304 while the other arm does not include pins.

Battery lock 202 may be manufactured from plastics such as polyetheretherketone, sometimes referred to as PEEK. Battery lock 202 may be manufactured via injection molding, overmolding, etc. Battery lock 202 may also be manufactured from metals and may be casts and/or machined.

Figure 4A:
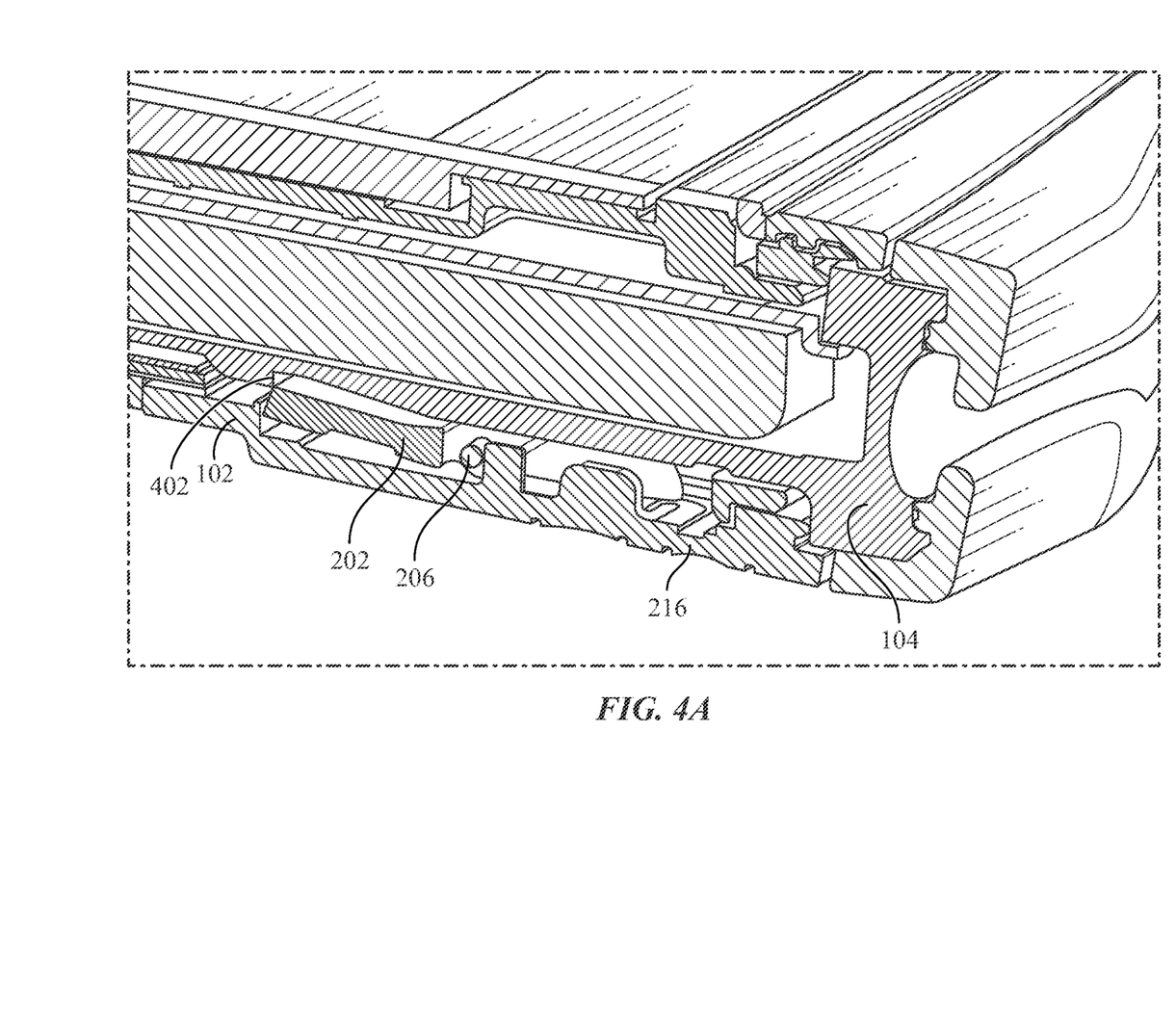
FIGS. 4A, 4B, and 4C show example method stages for ejecting a battery consistent with this disclosure.
Figure 4B:
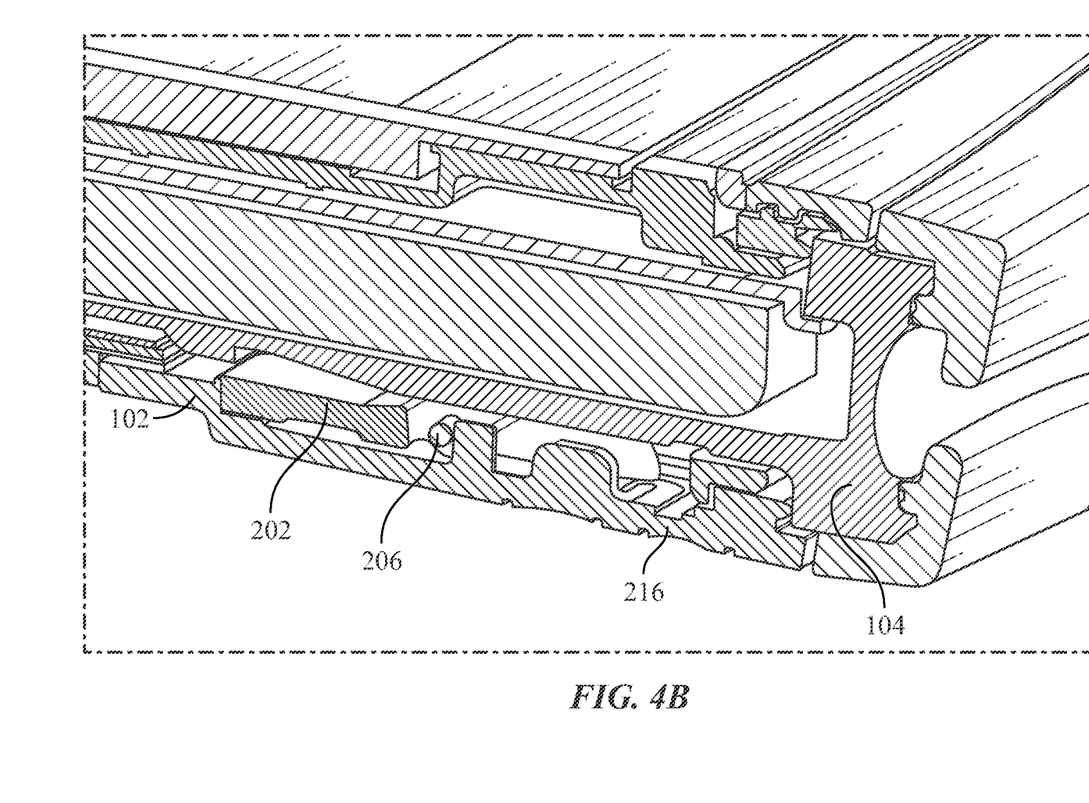
Figure 4C:
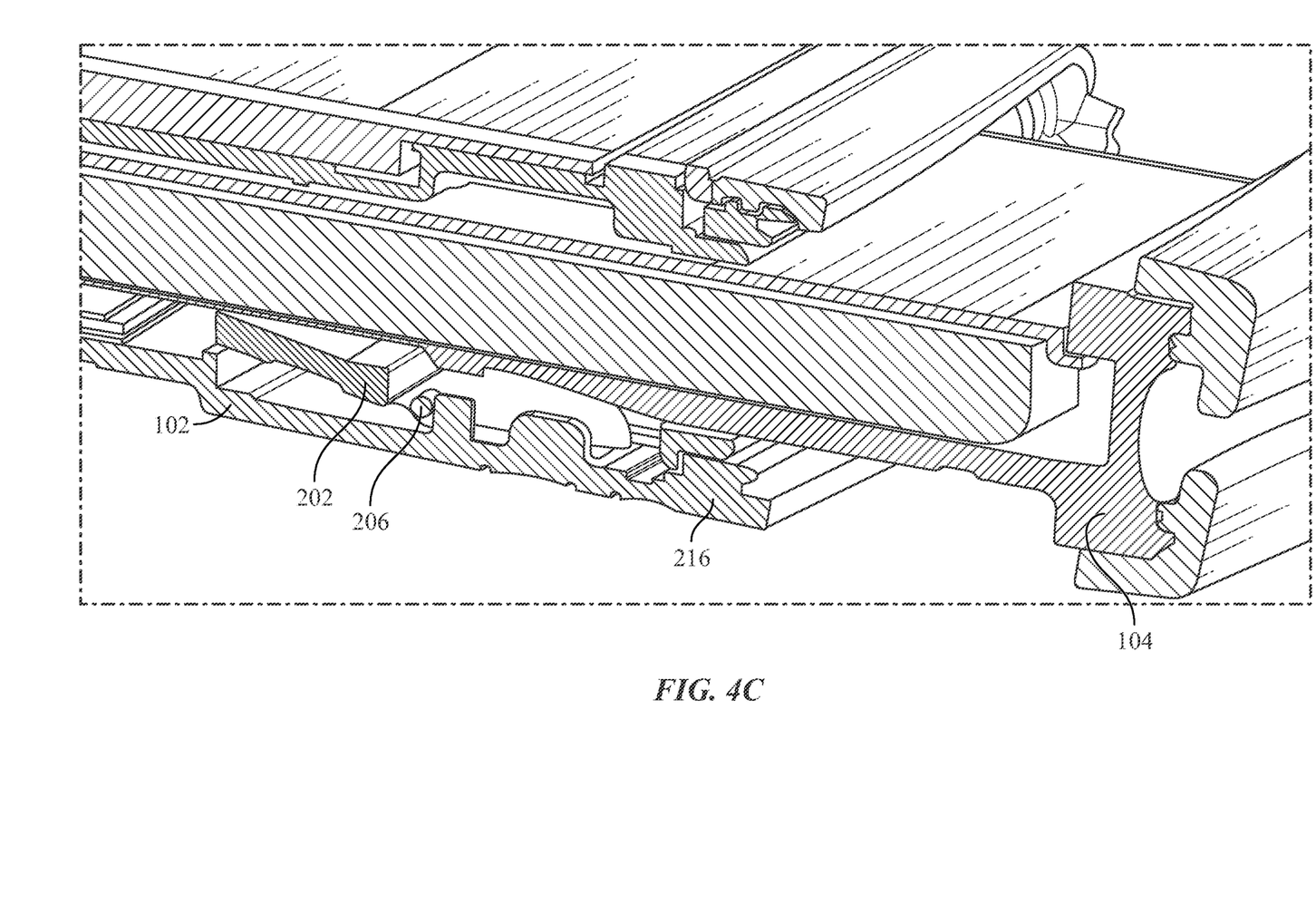

FIGS. 4A, 4B, and 4C show the stages of ejecting battery 104 from portable computing device 102. As shown in FIG. 4A, a first end of battery lock 202 may rest in a recess 402 defined in battery 104. First plurality of arms 218 may create the biasing force that cause battery lock 202 to rotate about pin 206 such that the first end of battery lock 202 rests within recess 402.

As shown in FIG. 4B, pressing button 216 may cause the first end of battery lock 202 to slide out of recess 402. Once battery lock 202 is not engaged with recess 402, second plurality of arms 220 may press against battery 104 as described herein. The ejection force generated by second plurality of arms 220 may cause battery 104 to slide out of cavity 108 as shown in FIG. 4C.

EXAMPLES

Example 1 is a battery lock comprising: a body having a first end, a second end, and a pivot axis located in between the first end and the second end; a first arm extending from the body proximate the first end, the first arm configured to provide a biasing force that biases movement of the body in a first direction about the pivot axis when the battery lock is installed; and a second arm extending from the body proximate the first end, the second arm configured to provide an ejection force to a battery.

In Example 2, the subject matter of Example 1 optionally includes a third arm extending from the body opposite the first arm, the third arm configured to provide the biasing force along with the first arm.

In Example 3, the subject matter of any one or more of Examples 1-2 optionally include a fourth arm extending from the body opposite the third arm, the fourth arm configured to provide the ejection force along with the second arm.

In Example 4, the subject matter of any one or more of Examples 1-3 optionally include wherein the second arm comprises a pin extending from the second arm, the pin configured to contact the battery when the battery is installed.

In Example 5, the subject matter of any one or more of Examples 1-4 optionally include wherein the body defines a notch at the second end of the body.

In Example 6, the subject matter of any one or more of Examples 1-5 optionally include wherein the body defines a through hole, the pivot axis passing through a center of the through hole.

Example 7 is a battery lock comprising: a body having a first end, a second end, and a pivot axis located in between the first end and the second end; a first plurality of arms extending from the body proximate the first end, the first plurality of arms arranged to contact a surface of a portable computing device when the battery lock is installed within the portable computing device and provide a biasing force that biases movement of the body in a first direction about the pivot axis; and a second plurality of arms extending from the body proximate the first end, the second plurality of arms arranged to contact a surface of a battery and provide an ejection force when the battery is installed in the portable computing device.

In Example 8, the subject matter of Example 7 optionally includes wherein each of the second plurality of arms comprises a pin extending from a respective one of the second plurality of arms such that each of the pins contact the surface of the battery.

In Example 9, the subject matter of any one or more of Examples 7-8 optionally include wherein the body defines a through hole in between the first end and the second end of the body, the pivot axis passing through a center of the through hole.

In Example 10, the subject matter of any one or more of Examples 7-9 optionally include wherein the body defines a notch at the second end of the body.

In Example 11, the subject matter of any one or more of Examples 7-10 optionally include where the first plurality of arms includes an even number of arms equally distributed on opposite sides of the body.

In Example 12, the subject matter of any one or more of Examples 7-11 optionally include where the second plurality of arms includes an even number of arms equally distributed on opposite sides of the body.

Example 13 is a portable computing device comprising: a housing defining a battery compartment and an opening; a battery sized to slide into the opening and into the battery compartment, the battery defining a notch; and a battery lock arranged within the housing, the battery lock comprising: a body having a first end, a second end, and a pivot axis located in between the first end and the second end, the second end of the battery sized to fit at least partially into the notch defined by the battery, a first plurality of arms extending from the body proximate the first end, the first plurality of arms arranged to contact a surface of surface of the housing and provide a biasing force that biases movement of the body in a first direction about the pivot axis, and a second plurality of arms extending from the body proximate the first end, the second plurality of arms arranged to contact a surface of the battery and provide an ejection force when the battery is installed in the portable computing device.

In Example 14, the subject matter of Example 13 optionally includes wherein each of the second plurality of arms comprises a pin extending from a respective one of the second plurality of arms such that each of the pins contact the surface of the battery.

In Example 15, the subject matter of any one or more of Examples 13-14 optionally include wherein the body defines a through hole in between the first end and the second end of the body, the pivot axis passing through a center of the through hole.

In Example 16, the subject matter of any one or more of Examples 13-15 optionally include wherein the body defines a notch at the second end of the body, the notch sized to receive a portion of a tab extending from the surface of the housing.

In Example 17, the subject matter of any one or more of Examples 13-16 optionally include where the first plurality of arms includes an even number of arms equally distributed on opposite sides of the body.

In Example 18, the subject matter of any one or more of Examples 13-17 optionally include where the second plurality of arms includes an even number of arms equally distributed on opposite sides of the body.

In Example 19, the subject matter of any one or more of Examples 13-18 optionally include a button passing through the surface of the housing and contacting the body at the second end, the button operative to cause the body to pivot in a second direction about the pivot axis when the button is pressed, whereby pressing the button cause the ejection force provided by the second plurality of arms to eject the battery.

In Example 20, the subject matter of any one or more of Examples 13-19 optionally include wherein insertion of the battery into the battery compartment causes the second plurality of arms to generate the ejection force.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A battery lock comprising:
   a body having a first end, a second end, and a pivot axis located in between the first end and the second end;
   a first arm extending from the body proximate the first end, the first arm configured to provide a biasing force that biases movement of the body in a first direction about the pivot axis when the battery lock is installed; and
   a second arm extending from the body proximate the first end, the second arm configured to provide an ejection force to a battery.

2. The battery lock of claim 1, further comprising a third arm extending from the body opposite the first arm, the third arm configured to provide the biasing force along with the first arm.

3. The battery lock of claim 1, further comprising a fourth arm extending from the body opposite the third arm, the fourth arm configured to provide the ejection force along with the second arm.

4. The battery lock of claim 1, wherein the second arm comprises a pin extending from the second arm, the pin configured to contact the battery when the battery is installed.

5. The battery lock of claim 1, wherein the body defines a notch at the second end of the body.

6. The battery lock of claim 1, wherein the body defines a through hole, the pivot axis passing through a center of the through hole.

7. A battery lock comprising:
   a body having a first end, a second end, and a pivot axis located in between the first end and the second end;
   a first plurality of arms extending from the body proximate the first end, the first plurality of arms arranged to contact a surface of a portable computing device when the battery lock is installed within the portable computing device and provide a biasing force that biases movement of the body in a first direction about the pivot axis; and
   a second plurality of arms extending from the body proximate the first end, the second plurality of arms arranged to contact a surface of a battery and provide an ejection force when the battery is installed in the portable computing device.

8. The battery lock of claim 7, wherein each of the second plurality of arms comprises a pin extending from a respective one of the second plurality of arms such that each of the pins contact the surface of the battery.

9. The battery lock of claim 7, wherein the body defines a through hole in between the first end and the second end of the body, the pivot axis passing through a center of the through hole.

10. The battery lock of claim 7, wherein the body defines a notch at the second end of the body.

11. The battery lock of claim 7, where the first plurality of arms includes an even number of arms equally distributed on opposite sides of the body.

12. The battery lock of claim 7, where the second plurality of arms includes an even number of arms equally distributed on opposite sides of the body.

13. A portable computing device comprising:
   a housing defining a battery compartment and an opening;
   a battery sized to slide into the opening and into the battery compartment, the battery defining a notch; and
   a battery lock arranged within the housing, the battery lock comprising:
      a body having a first end, a second end, and a pivot axis located in between the first end and the second end, the second end of the battery sized to fit at least partially into the notch defined by the battery,
      a first plurality of arms extending from the body proximate the first end, the first plurality of arms arranged to contact a surface of surface of the housing and provide a biasing force that biases movement of the body in a first direction about the pivot axis, and
      a second plurality of arms extending from the body proximate the first end, the second plurality of arms arranged to contact a surface of the battery and provide an ejection force when the battery is installed in the portable computing device.

14. The portable computing device of claim 13, wherein each of the second plurality of arms comprises a pin extending from a respective one of the second plurality of arms such that each of the pins contact the surface of the battery.

15. The portable computing device of claim 13, wherein the body defines a through hole in between the first end and the second end of the body, the pivot axis passing through a center of the through hole.

16. The portable computing device of claim 13, wherein the body defines a notch at the second end of the body, the notch sized to receive a portion of a tab extending from the surface of the housing.

17. The portable computing device of claim 13, where the first plurality of arms includes an even number of arms equally distributed on opposite sides of the body.

18. The portable computing device of claim 13, where the second plurality of arms includes an even number of arms equally distributed on opposite sides of the body.

19. The portable computing device of claim 13, further comprising a button passing through the surface of the housing and contacting the body at the second end, the button operative to cause the body to pivot in a second direction about the pivot axis when the button is pressed, whereby pressing the button cause the ejection force provided by the second plurality of arms to eject the battery.

20. The portable computing device of claim 13, wherein insertion of the battery into the battery compartment causes the second plurality of arms to generate the ejection force.

\* \* \* \* \*